Sept. 17, 1940. M. N. BULFORD Re. 21,568

TEXTILE PRINTING MACHINE

Original Filed Sept. 29, 1938

INVENTOR
Murray N. Bulford
BY
Marshall & Hawley
ATTORNEYS

Reissued Sept. 17, 1940

Re. 21,568

UNITED STATES PATENT OFFICE 21,568

TEXTILE PRINTING MACHINE

Murray N. Bulford, Clearwater, S. C., assignor to United Merchants & Manufacturers, Inc., New York, N. Y., a corporation of Delaware Original No. 2,158,027, dated May 9, 1939, Serial No. 232,246, September 29, 1938. Application for reissue August 24, 1939, Serial No. 291,714

18 Claims. (Cl. 101—248)

This invention relates to improvements in textile printing machines.

Its object is to provide instrumentalities for guiding the printed web onto the engraved rolls in perfect alinement therewith so that no backgrey is needed.

Hitherto it has been necessary to make the engraved part of the printing rolls wider than the web to be printed in order to make the printing extend to the edges of the web, and to use a backgrey to absorb any coloring matter from the engraved parts of the roll which are beyond the edges of the cloth and so protect the blanket which is between the printed web and the pressure cylinder.

According to my invention, the accurate alinement of the web with the engraved printing rolls makes it possible to use shorter printing rolls and to limit the length of the engraving on them to the width of the web as the printing to the edges of the web is insured by the guiding mechanism. Thus, a saving of the amount of coloring matter is effected. Furthermore, as none of the engraved portions of the rolls extend beyond the edges of the web, no backgrey is needed. It also results in maintaining an even pattern in relation to the selvage of the cloth.

More specifically, my invention relates to the use of lateral adjusting mechanism for the web controlled by photo-electric tubes positioned at the edges of the web close to the line of contact between the printing roll and the pressure cylinder. This arrangement is effective because it does not depend upon any contact with the edge of the web, nor is it affected by inequalities of elasticity in the opposite sides of the web.

I will describe my invention in the following specification and point out its novel features in appended claims.

Figure 1:
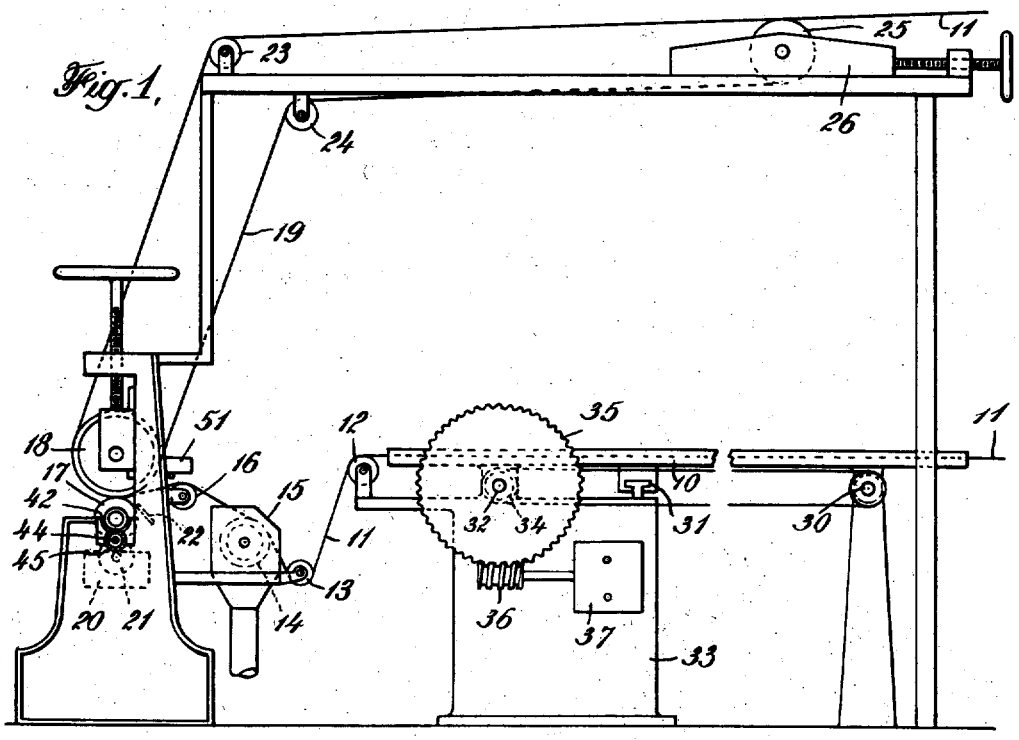
Fig. 1 is a side elevation of a printing machine which is made according to and embodies my invention.

10 designates a tenter frame on which the web 11 is stretched to the desired width and from which it passes over a roller 12 to the printer. The web passes under a roller 13, over a brush 14 in a vacuum chamber 15 and over another roller 16 which leads it between a printing roll 17 and a rubber covered pressure cylinder 18. The length of the engraving on the printing roll is indicated by the line A—B (Fig. 2) which also indicates the width of the web to be printed. A printing blanket 19 also runs between the printing roll and the pressure cylinder. 20 is a color box in which is a brush 21 which carries the coloring matter to the engraved printing roll 17. 22 is an oscillating doctor blade which removes the coloring matter from the outer surface of the roll 17.

The blanket 19 is an endless belt which passes under the pressure cylinder 18, over guide rollers 23, 24 and around a tension roller 25 on an adjustable frame 26.

As these parts are well known, they are shown more or less diagrammatically and described briefly.

There may be several printing rolls spaced about the pressure cylinder for applying different colors to the web. According to former practice, the engraving on printing rolls has to be longer than the width of the web to insure printing to the edges of the web and another cloth, called a backgrey, is interposed between the printing blanket 19 and the web 11 to absorb the color from the overlapping engraving on the printing rolls.

According to my invention, the engraved portion of the printing roll or rolls is made of the same length as the width of the web and the backgrey is eliminated. Printing to the extreme edges of the web is accomplished by maintaining the web in exact alinement with the engraved portion of the printing roll or rolls by the instrumentalities which I will now describe.

The end of the tenter frame remote from the printer is adjustably supported, as shown at 30. Its other end is guided in a transverse track 31. 32 is a transverse screw suported against side movement in pedestals 33, 33 (see Fig. 3). Internally threaded lugs 34, 34 which engage the screws 32 depend from the tenter frame. 35 is a worm wheel affixed to the shaft of the screw 32. This is engaged by a worm 36 on the shaft of a reversible electric motor 37.

Figure 3:
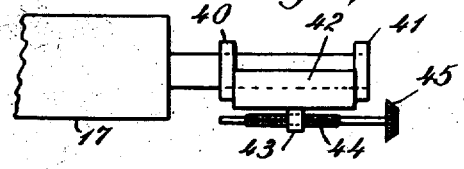
Fig. 3 is a side elevation of a mechanism for manually adjusting the printing roll laterally.

The mechanism shown in Fig. 3 is an arrangement for manually adjusting the printing roll 17 laterally. The bearings for the roll, which are not shown, are of sufficient width to permit some lateral movement of the roll to bring its engraved portion into alinement with the web. 40 and 41 are spaced flanges projecting from the shaft of the roll. Between them is fitted a guide member 42 from which projects an internally threaded boss 43. 44 is a threaded shaft parallel with the axis of the roll 17 and held against longitudinal movement. 45 is a bevel gear affixed to shaft 44 which can be turned by another bevel gear on a hand wheel shaft not shown.

Figure 2:
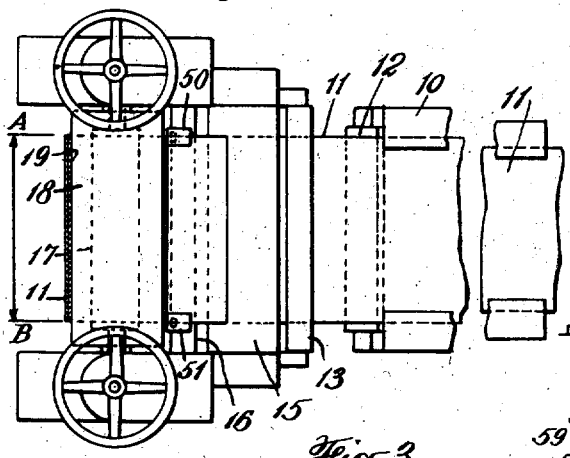
Fig. 2 is a plan view of some of the parts shown in Fig. 1.

50, 51 are photo-electric tubes positioned, as shown in Figs. 1 and 2, near the point where the web 11 passes into the printer. Beams of light are passed vertically through these tubes at the edges of the web to render them active and capable of carrying currents of electricity.

Figure 4:
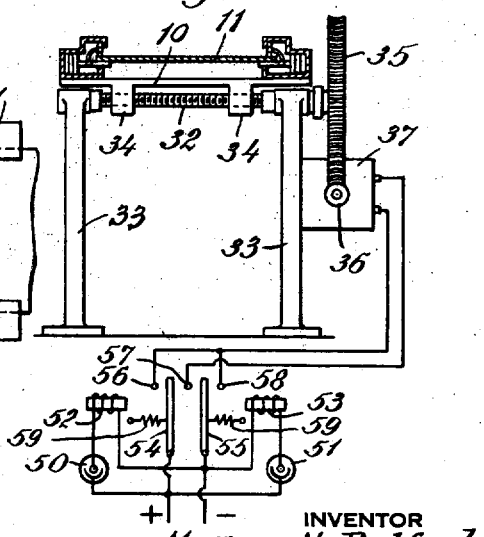
Fig. 4 is an end elevation of the tenter frame shown in the preceding figures, together with a diagram of certain electrical circuits which may be used in carrying out my invention.

As shown in Fig. 4, one terminal of each tube is connected with the + main from a source of electrical energy. The other terminal of tube 50 is connected with one end of a relay coil 52, the other end of which is connected with the — main from the electrical supply. Similarly, the other terminal of tube 51 is connected with one end of a relay coil 53, the other end of which is connected with the — main.

The coils 52, 53 are in axial alinement and act upon cores which are connected to the pivoted blades 54, 55 of a self-centering reversing switch which has stationary contacts 56, 57 and 58. The contacts 56, 58 are connected together and to one of the terminals of the motor 37. Contact 57 is connected to the other terminal of the motor.

This arrangement is such that when equal amounts of light pass through the tubes 50, 51, the effect of the coils 52, 53 on the reversing switch blades will be equal and opposite and they will remain in the neutral position in which they are shown in Fig. 4, springs 59 being shown as a means for centering them. If the light passing through tube 50, for example, is diminished or shut off, as it will be if the web 11 runs toward it, even to a slight degree, the coil 52 will be deenergized and coil 53 will pull the reversing switch blades 54, 55 onto contacts 57, 58, respectively. This will cause the motor 37 to rotate in one direction and through the mechanism described will shift the tenter frame 10 laterally in the direction to move the edge of web 11 away from the light rays for tube 50. As soon as the web has been shifted sufficiently to cause tube 50 to be active, its coil 52 will be energized to neutralize the effect of coil 53 and the reversing switch blades will be centered to shut off the motor current and stop the lateral movement of the tenter frame.

Obviously, the effect of the web 11 running out of alinement with the engraved portion of the printing roll in the opposite direction will be corrected similarly. Thus, by this simple expedient the tenter frame which brings the web to a width which corresponds to the length of engraving on the printing roller will be moved laterally automatically to maintain the web in alinement with the engraving to get the desired result.

It is to be understood that the various parts shown and described are diagrammatic and that many variations and modifications may be made within the spirit and scope of the invention. I intend no limitations other than those imposed by the appended claims.

What I claim is:

1. The combination of a printing unit and a tenter frame, the printing unit having a pressure cylinder and a printing roll arranged to continuously propel a textile fabric at the speed of the tenter frame and the tenter frame being positioned to lead the fabric directly to the printing unit.

2. The combination of a printing unit and a tenter frame, the printing unit having a pressure cylinder and a printing roll arranged to propel a textile material and its printing roll having an engraved portion of a predetermined length, said tenter frame being arranged to stretch the fabric to a width corresponding to the length of the engraved portion of the printing roll and being positioned to lead the fabric directly to the printing unit in alinement with the engraved portion of said printing roll.

3. A textile printing machine comprising a printing roll having an engraved portion of predetermined length combined with means for stretching a web of textile material to a width corresponding to the length of said engraved portion of the roll, said stretching means being positioned to lead the web to the roll.

4. A textile printing machine comprising a printing roll having an engraved portion of predetermined length combined with means for stretching a web of textile material to a width corresponding to the length of said engraved portion of the roll and leading the web to the roll, and means for moving said stretching means laterally to maintain the web in alinement with the engraved portion of the roll.

5. A textile printing machine comprising a printing roll having an engraved portion of predetermined length combined with means for stretching a web of textile material to a width corresponding to the length of said engraved portion of the roll and leading the web to the roll, and electrically controlled means for automatically moving said stretching means laterally to maintain the web in alinement with the engraved portion of the roll.

6. A textile printing machine comprising a printing roll having an engraved portion of predetermined length combined with means for stretching a web of textile material to a width corresponding to the length of said engraved portion of the roll and leading the web to the roll, and electrically controlled means comprising an electro-responsive device positioned near the roll for automatically moving said stretching means laterally to maintain the web in alinement with the engraved portion of the roll.

7. A textile printing machine comprising a printing roll having an engraved portion of predetermined length combined with means for stretching a web of textile material to a width corresponding to the length of said engraved portion of the roll and leading the web to the roll, motor actuated mechanism for automatically moving said stretching means laterally to maintain the web in alinement with the engraved portion of the roll, circuits for the motor and spaced electro-responsive control devices in said circuits.

8. A textile printing machine comprising a printing roll having an engraved portion of predetermined length combined with means for stretching a web of textile material to a width corresponding to the length of said engraved portion of the roll, motor actuated mechanism for automatically moving said stretching means laterally to maintain the web in alinement with the engraved portion of the roll, circuits for the motor and spaced photo-electric control devices in said circuits.

9. A textile printing machine comprising a printing roll having an engraved portion of predetermined length combined with a tenter frame arranged to stretch a web of textile material to a width corresponding to the length of said engraved portion of the roll and positioned to lead the web to the roll, and means for moving the tenter frame laterally to maintain the web in alinement with said engraved portion of the roll.

10. A textile printing machine comprising a printing roll having an engraved portion of predetermined length combined with a laterally movable tenter frame arranged to stretch a web of textile material to a width corresponding to the length of said engraved portion of the roll and positioned to lead the web to the roll, automatic means for moving the tenter frame to maintain the web in alinement with said engraved portion of the roll, and spaced electro-responsive control devices for said moving means positioned near the roll.

11. A textile printing machine comprising a printing roll having an engraved portion of predetermined length combined with a laterally movable tenter frame arranged to stretch a web of textile material to a width corresponding to the length of said engraved portion of the roll and positioned to lead the web to the roll, mechanism for moving the tenter frame to maintain the web in alinement with said engraved portion of the roll, an electric motor for actuating said mechanism, circuits for the motor, and spaced electro-responsive control devices in said circuits positioned near the roll.

12. A textile printing machine comprising a printing roll having an engraved portion of predetermined length combined with a laterally movable tenter frame arranged to stretch a web of textile material to a width corresponding to the length of said engraved portion of the roll and positioned to lead the web to the roll, mechanism for moving the tenter frame to maintain the web in alinement with said engraved portion of the roll, an electric motor for actuating said mechanism, circuits for the motor, and spaced photo-electric control devices in said circuits positioned near the roll.

13. A textile printing machine comprising a printing roll having an engraved portion of predetermined length, a laterally movable tenter frame arranged to stretch a web of textile material to a width corresponding to the length of said engraved portion of the roll, mechanism for moving the tenter frame to maintain the web in alinement with said engraved portion of the roll, a reversible electric motor for actuating said mechanism, circuits for the motor, a self-centering reversing switch in the motor circuits, relay coils for actuating the reversing switch, spaced photo-electric tubes positioned near the roll, and control circuits passing through the relay coils and the photo-electric tubes.

14. A textile printing machine comprising a printing roll having an engraved portion of predetermined length combined with a laterally movable tenter frame arranged to stretch a web of textile material to a width corresponding to the length of said engraved portion of the roll and positioned to lead the web to the roll, manual means for alining the engraved portion of the roll with the web, mechanism for moving the tenter frame to maintain the web in alinement with said engraved portion of the roll, an electric motor for actuating said mechanism, circuits for the motor, and spaced electro-responsive control devices in said circuits positioned near the roll.

15. A textile printing machine comprising a printing roll having an engraved portion of predetermined length combined with a laterally movable tenter frame arranged to stretch a web of textile material to a width corresponding to the length of said engraved portion of the roll and positioned to lead the web to the roll, manual means for alining the engraved portion of the roll with the web, mechanism for moving the tenter frame to maintain the web in alinement with said engraved portion of the roll, a reversible electric motor for actuating said mechanism, circuits for the motor, a self-centering reversing switch in the motor circuits, relay coils for actuating the reversing switch, spaced photo-electric tubes positioned near the roll and control circuits for the relays passing through the relay coils and the photo-electric tubes.

16. A textile printing machine comprising a rotating printing roll having an engraved portion of predetermined limited length, combined with a mechanism for bringing a moving web of textile material to be printed to a width corresponding to the length of said engraved portion of the roll, said mechanism being positioned to lead the web to the roll.

17. A textile printing machine comprising a rotating printing roll having an engraved portion of predetermined limited length, combined with a mechanism for bringing a moving web of textile material to be printed to a width corresponding to the length of said engraved portion of the roll, and automatic means for guiding the web from said mechanism to the roll to bring the edges of the web into substantial alinement with the ends of the engraved portion of the roll.

18. A textile printing machine comprising a rotating printing roll having an engraved portion of predetermined limited length, combined with a mechanism for bringing a moving web of textile material to be printed to a width corresponding to the length of said engraved portion, automatic means for laterally shifting the relative positions of the printing roll and said mechanism to maintain the edges of the web in substantial alinement with the ends of the engraved portion of the roll.

MURRAY N. BULFORD.